(12) United States Patent
Heinz

(10) Patent No.: US 10,453,632 B2
(45) Date of Patent: Oct. 22, 2019

(54) DIRECT CURRENT SWITCHING DEVICE AND USE THEREOF

(71) Applicant: SIEMENS AKTIENGESELLSCHAFT, Munich (DE)

(72) Inventor: Thomas Heinz, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 15/758,938

(22) PCT Filed: Aug. 19, 2016

(86) PCT No.: PCT/EP2016/069668
§ 371 (c)(1),
(2) Date: Mar. 9, 2018

(87) PCT Pub. No.: WO2017/045861
PCT Pub. Date: Mar. 23, 2017

(65) Prior Publication Data
US 2019/0043680 A1 Feb. 7, 2019

(30) Foreign Application Priority Data
Sep. 15, 2015 (DE) .................. 10 2015 217 578

(51) Int. Cl.
*H01H 33/59* (2006.01)
*G05B 19/10* (2006.01)
*H01C 7/12* (2006.01)

(52) U.S. Cl.
CPC .......... *H01H 33/596* (2013.01); *G05B 19/10* (2013.01); *G05B 2219/21136* (2013.01); *H01C 7/12* (2013.01)

(58) Field of Classification Search
CPC ......... H01H 33/596; G05B 19/10; H01C 7/12
See application file for complete search history.

(56) References Cited

U.S. PATENT DOCUMENTS 3,758,790 A * 9/1973 Kind .................. H01H 9/54
361/3
5,452,170 A * 9/1995 Ohde .................. H01H 33/596
174/DIG. 17

(Continued)

FOREIGN PATENT DOCUMENTS

CN 102780200 A 11/2012
CN 102780201 A 11/2012

(Continued)

OTHER PUBLICATIONS

Keith A. Corzine, et al; "A New Z-Source DC Circuit Breaker"; IEEE Transactions on Power Electronics; Jun. 2012; pp. 2796-2804, vol. 27, No. 6; IEEE.

(Continued)

*Primary Examiner* — Daniel Kessie
(74) *Attorney, Agent, or Firm* — Laurence Greenberg; Werner Stemer; Ralph Locher

(57) ABSTRACT

A direct current switching device for interrupting an electric direct current flowing along a medium or high voltage current path. An electric circuit arrangement has a mechanical switching device connected in the current path and a circuit unit for forcing a zero-crossing point in the mechanical switching device. The circuit unit has multiple capacitive components and a switch which are connected in the circuit unit such that, in a first switching state of the switch, the capacitive components are connected in parallel for a respective electric charging process via the medium or high voltage current path and, in a second switching state of the switch, the capacitive components are connected in series in order to generate a current pulse which forces the zero-crossing point. The direct current switching device is useful for interrupting an electric direct current flowing along the medium or high voltage current path.

8 Claims, 3 Drawing Sheets

(56) References Cited

U.S. PATENT DOCUMENTS

| | | |
|---|---|---|
| 9,478,974 B2 | 10/2016 | Gaxiola et al. |
| 2009/0315654 A1 | 12/2009 | Halen et al. |
| 2010/0006544 A1 | 1/2010 | Onufriyenko et al. |
| 2012/0286589 A1 | 11/2012 | Kostovic |
| 2013/0020881 A1* | 1/2013 | Panousis ............. H01H 33/596 307/113 |
| 2013/0070492 A1 | 3/2013 | Skarby |
| 2014/0226247 A1 | 8/2014 | Gaxiola et al. |
| 2014/0233140 A1* | 8/2014 | Gaxiola ............... H02H 3/087 361/67 |
| 2014/0299579 A1 | 10/2014 | Hartmann et al. |
| 2014/0327420 A1* | 11/2014 | Lee ..................... H02M 3/07 323/282 |
| 2016/0285250 A1* | 9/2016 | Lee ..................... H01H 9/54 |
| 2016/0336734 A1* | 11/2016 | Lee ..................... H02H 3/202 |
| 2017/0263399 A1* | 9/2017 | Heinz ................. H01H 33/167 |
| 2018/0138687 A1* | 5/2018 | Yang ................... H01H 9/542 |

FOREIGN PATENT DOCUMENTS

| | | |
|---|---|---|
| CN | 103117528 A | 5/2013 |
| DE | 1020111079723 A1 | 1/2013 |
| DE | 102011082568 A1 | 3/2013 |
| DE | 102011083514 A1 | 3/2013 |
| DE | 102011083693 B3 | 3/2013 |
| EP | 2894653 A1 | 7/2015 |
| JP | S61171020 A | 8/1986 |
| RU | 1812567 C | 4/1993 |
| RU | 2439737 C2 | 1/2012 |
| RU | 2448386 C2 | 4/2012 |
| WO | 2014154260 A1 | 10/2014 |
| WO | 2014166528 A1 | 10/2014 |
| WO | 2015081615 A1 | 6/2015 |

OTHER PUBLICATIONS

Keith A. Corzine, et al; "Structure and Analysis of the Z-Source MVDC Breaker"; 2011; pp. 334-338, IEEE.

Keith A. Corzine, et al; A New Z-Source Dc Circuit Breaker; 2010; pp. 585-590; IEEE; ISBN:978-1-4244-6392-3/10.

* cited by examiner

DIRECT CURRENT SWITCHING DEVICE AND USE THEREOF

BACKGROUND OF THE INVENTION

Field of the Invention

The invention relates to a direct-current switching device for interrupting a direct electric current I flowing along a medium- or high-voltage current path, having an electrical circuit arrangement, which comprises a mechanical switching device that can be connected in the medium- or high-voltage current path, and at least one circuit unit in order to force a current zero crossing in the mechanical switching device, which is connected in the medium- or high-voltage current path.

A mechanical switching device from the field of medium- and high-voltage technology, such as a vacuum interrupter, requires a current zero crossing for the interruption of a current. In the currently prevailing technology for the generation, transmission and distribution of electrical energy by means of AC power, this current zero crossing is, of course, always present.

The present development in the field of the generation, transmission and distribution of electrical energy is aimed at increasing the use of systems with direct current, so that corresponding direct-current switching devices become necessary. With direct current, however, the required current zero crossing is absent and must, therefore, be artificially generated by using a mechanical switching device.

A direct-current switching device of the above-mentioned type is disclosed in US 2013/0070492 A1. This shows a direct current switching device for interrupting a DC electrical current flowing along a high-voltage direct current path, having an electrical circuit arrangement, which has a mechanical interrupter that can be connected in the high-voltage direct current path and a circuit unit for forcing a current zero crossing in the mechanical switching device, which is connected in the medium- or high-voltage current path. This circuit unit has an LC-circuit with at least one inductive component and at least one capacitive component for the formation of an active resonant circuit closed via the interrupter, and a switchable semiconductor element for generating an excitation frequency exciting the resonant circuit. This semiconductor component is a semiconductor component of the circuit-breaking type connected in series with the mechanical interrupter in the DC current path. By switching the semiconductor component with a frequency tuned to the active resonant circuit, an alternating current is modulated onto the direct current, which excites the resonant circuit into oscillation. If the current amplitude of the oscillation of this resonant circuit is larger than the direct current, or if the current amplitude of the oscillation has at least the same amplitude, then this creates the desired current zero crossing. DE 10 2011 079 723 A1 shows a further direct current switching device with two interrupters and an alternatively operating circuit unit for forcing a current zero crossing.

SUMMARY OF THE INVENTION

The object of the invention is to specify an alternatively designed direct current switching device for medium and high voltage applications.

The object is achieved by means of the features of the independent claims. Advantageous embodiments are specified in the dependent claims.

In the direct current switching device according to the invention it is provided that the at least one circuit unit comprises a plurality of capacitive components and a switch. The capacitive components and the switch are connected in the circuit unit in such a way that the capacitive components in accordance with the switching state of the switch are either (a) connected in parallel for their respective electrical charging via the medium- or high-voltage current path or (b) connected in series to generate a current pulse which forces the current zero crossing.

In contrast to the known direct current switching devices with a resonant circuit, the current zero crossing is obtained by means of a (single) current pulse of suitable size. This is generated by the serial connection of the capacitive components of the circuit unit that are held charged by the current path itself.

In accordance with a preferred design of the invention, the at least one circuit unit is implemented as an H-shaped bridge circuit trained or has at least one such H-shaped bridge circuit. In this case, the capacitive components and the switching device are arranged in this H-shaped bridge circuit.

In accordance with another preferred design of the invention it is provided that the circuit unit also comprises a plurality of inductive components and/or a plurality of resistance components.

It is in particular provided that the H-shaped bridge circuit or at least one of the H-shaped bridge circuits
- comprises a first current branch diverging from the medium- or high-voltage current path, in which at least one of the capacitive components, at least one of the inductive components and at least one of the resistance components are arranged in series,
- comprises a second current branch diverging from the medium- or high-voltage current path, in which at least one of the capacitive components, at least one of the inductive components and at least one of the resistance components are arranged in series and
- a transverse current path connecting the first current branch to the second current branch, in which the switching device is arranged.

In particular, it is provided that both current branches connect the medium- or high-voltage current path with a common reference potential. This reference potential is preferably earth potential.

According to yet another preferred embodiment of the invention it is provided that the capacitive component of the first current branch is arranged in the first current branch between the medium- or high-voltage current path and the transverse current path and the capacitive component of the second current branch is arranged on the side of the second current branch facing away from the medium- or high-voltage current path—with respect to the transverse current path.

In a further advantageous design it is provided that at least one of the mechanical switching devices is designed as a vacuum interrupter. A particular advantage is obtained if all mechanical switching devices are designed as vacuum interrupters.

In accordance with another preferred embodiment of the invention, (each of) the circuit arrangement(s) has a voltage surge arrester connected in parallel with the (respective) mechanical switching device.

Finally, it is preferably provided that the direct-current switching device also has a control and/or regulating device for the coordinated activation of the at least one mechanical switching device and of the at least one circuit unit.

The invention further relates to the use of the above-mentioned direct-current switching device for interrupting an electrical DC current I flowing along a medium- or high-voltage current path.

BRIEF DESCRIPTION OF THE SEVERAL VIEWS OF THE DRAWING

Hereafter, exemplary embodiments of the invention are shown in schematic drawings, and then described in greater detail below. These show.

DESCRIPTION OF THE INVENTION

Figure 1:
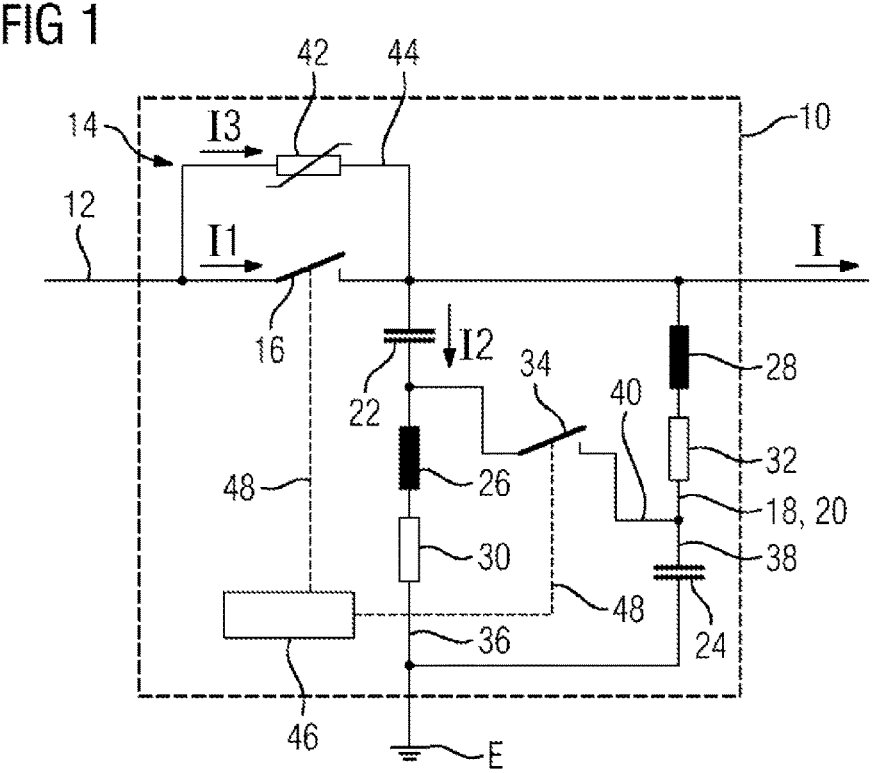
FIG. 1 a direct-current switching device according to a first preferred embodiment of the invention, FIG. 2 the chronological progression of various currents in the direct current switching device, FIG. 3 a direct-current switching device according to a second preferred embodiment of the invention, and FIG. 4 a direct-current switching device according to a third preferred embodiment of the invention.

FIG. 1 shows a direct current-switching device 10 for interrupting a direct electric current I flowing along a medium- or high-voltage current path 12 and a corresponding current path 12. The direct-current switching device 10 has an electrical circuit arrangement 14, which in turn comprises a mechanical switching device 16, or switch, that can be connected/is connected in the medium- or high-voltage current path 12, and a circuit unit 18, in order to force a current zero crossing in this mechanical switching device 16 connected in the medium- or high-voltage current path. This circuit unit 18 is arranged in the direction of the DC current I behind the mechanical switching device 16 (symbolized by the arrow near I).

The circuit unit 18 of the circuit arrangement 14 is configured as an H-shaped bridge circuit 20 with two capacitive components 22, 24, two inductive components 26, 28, two resistance components 30, 32 and a further component designed as a switch 34. The capacitive components 22, 24 are here designed as capacitors, the inductive components 26, 28 are as coils and the resistance components 30, 32 as ohmic resistors within the meaning of electrical components. The individual components 22, 24, 26, 28, 30, 32, 34 do not necessarily need to be present as the respective component element, but rather it is also possible that one component element forms a plurality of different components or individual components are formed by a plurality of component elements. For example, an actual coil normally forms an inductive component 26, 28 and a resistance (sub-) component 30, 32.

In principle, the switch 34 can be configured as a mechanical switching device, but other embodiments are also possible, for example, as a semiconductor switching device, as a triggered spark gap or as a comparably fast switch.

The components 22, 24, 26, 28, 30, 32, 34 mentioned are connected in the circuit unit 18 implemented as an H-shaped bridge circuit 20, in such a way that the capacitive components 22, 24, depending on the switching state of the switching device are either (a) in a first switching state, connected in parallel for their respective electrical charging via the medium- or high-voltage current path 12, or (b) in a second switching state, connected in series to generate a current pulse which forces the current zero crossing in the switching device 16. In the example, the first switching state an open switch state and the second switching state to a closed switch state of the switch 34.

In the above example, the H-shaped bridge circuit 20 has (i) a first current branch 36 diverging from the medium- or high-voltage current path 12, in which one of the capacitive components 22, one of the inductive components 26 and one of the resistance components 30 are arranged in series (as a first RLC-connection), (ii) a second current branch 38 diverging from the medium- or high-voltage current path 12, in which the other of the capacitive components 24, the other of the inductive components 28 and the other of the resistance components 32 are arranged in series (as a second RLC-connection) and (iii) a transverse current path 40 connecting the first current branch 36 to the second current branch 38, in which the switching device 32 is arranged. The two current branches 36, 38 in each case connect the medium- or high-voltage current path 12 to a common reference potential, which in this example is the ground potential E.

The capacitive component 22 of the first current branch 36 in this first current branch 36 is arranged between the medium- or high-voltage current path 12 and the transverse-current path 40 and the inductive component 26, as well as the resistance component 30 of the first current branch 36 is arranged between the transverse-current path 40 and the reference potential, thus the ground potential E. In addition, the inductive component 28 and the resistance component 32 of the second current branch 38 in this second current branch 38 are arranged between the medium- or high-voltage current path 12 and the transverse-current path 40 and the capacitive component 24 of the second current branch 38 is arranged between the transverse-current path 40 and the reference potential, thus the ground potential E.

The two parallel RLC connections are thus connected in opposite senses. The two RLC-connections can, in principle, however, also be interchanged.

The circuit arrangement 14 also has a surge arrester 42, which is connected in a parallel current path 44 in parallel with the mechanical switching device 16.

The direct-current switching device 10 also has a control and/or regulating device 46 for the coordinated activation of the at least one mechanical switching device 16 and the switching device 34. The activation takes place via signal paths 48.

This results in the following function:

In normal operation, the two capacitive components (capacitors) 22, 24 are charged via the DC power supply, which also includes the medium- or high-voltage current path 12, and the direct current I flows through the mechanical switching device 16. When is a switching operation occurs, the mechanical switching device 16 in the current path 12 is opened and the switching device 34 is closed with a slight delay.

By way of the closed switch 34, the two capacitive components 22, 24, which are charged up to the system voltage, are connected in series. At the mechanical switching device 16 in the current path 12 a brief over-voltage occurs, so that the current flow in the mechanical switching device 16 is briefly reversed and artificially set to zero. The current in the mechanical switching device 16 is interrupted and the parallel-connected surge arrester (e.g. MOVaristor) 42 protects the arrangement 10, 14 against resulting over-voltages.

Figure 2:
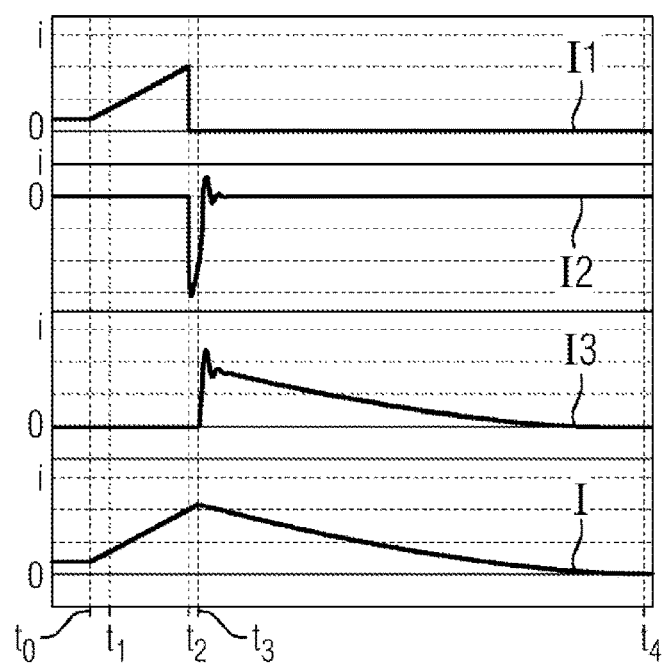

The time waveform of the resulting currents I, I1, I2, I3 is shown in the graph of FIG. 2, wherein a time window of a few milliseconds is shown. The corresponding data are generated by a simulation. In these, the direct current I is the direct current flowing in the direction of the current behind the direct current switching device 10. The current I1 is the direct current flowing through the mechanical switching device 16, the current I2 is the current flowing through the series circuit of the capacitive components 22, 24 and the current I3 is the current flowing through the surge arrester 42.

At time t0, the switching device 16 is (still) closed and the direct current I flows through the current path 12. The two capacitive components 22, 24 are charged to system voltage.

At time t1 the switching device 16 is now opened and an electric arc is produced. With a short delay, at time t3 the switching device 34 is then closed. By means of the series circuit of the two capacitive components 22, 24 which are charged to system voltage the current I2 flowing through the series circuit of the capacitive components 22, 24 is obtained. At the mechanical switching device 16 in the current path 12 this results in an over-voltage, so that the current flow in the mechanical switching device 16 is briefly reversed and artificially set to zero. The current I1 in the mechanical switching device 16 is interrupted and the parallel-connected surge arrester 42 protects the arrangement 10, 12 against resulting over-voltages.

From time t3, the corresponding current I3 then flows through the parallel current path 44 and the surge arrester 42 connected therein until a time t4, at which the current I3 and thus also the direct current I have completely decayed. The interruption of the direct current I along the current path 12 therefore fully completed.

Figure 3:
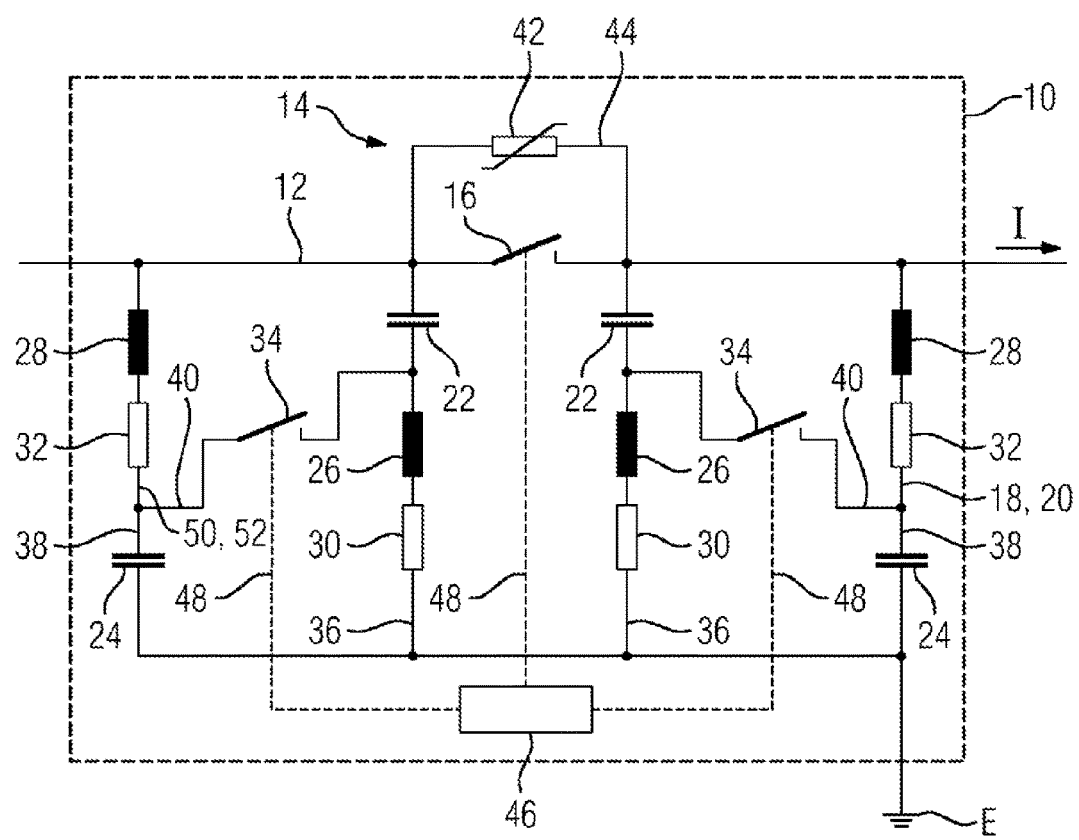
Figure 4:
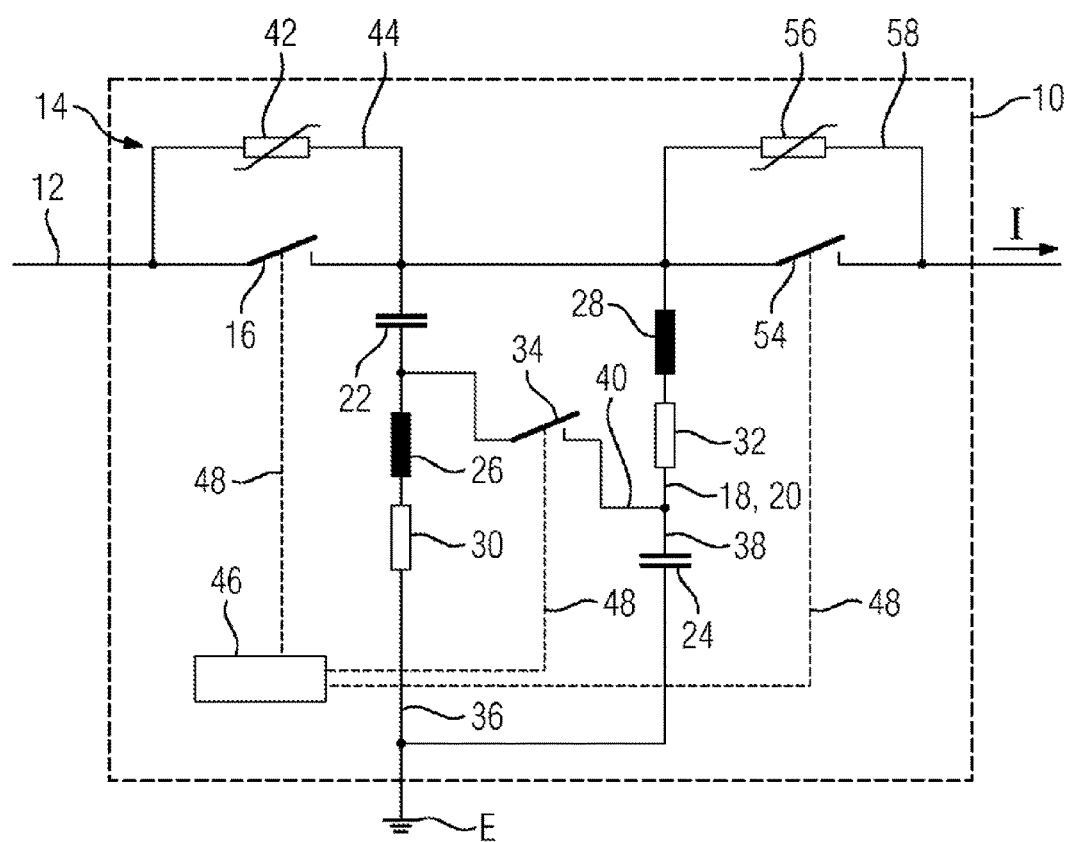

The direct current switching device 10 shown in FIG. 1 in this configuration shown in FIG. 1 is only suitable for unipolar operation. If it is intended that direct currents I in the opposite current direction are also to be interrupted, then the circuit arrangement 14 must be extended. One possibility is that the circuit unit 18, thus the H-bridge circuit 20 consisting of the two RLC connections and the switching device in the transverse-current path 40, are arranged a second time on the other side of the current path 12 with respect to the mechanical switching device 16. The resulting circuit units 18, 50, or H-bridge circuits 20, 52 can be contacted in the same direction or in its mirror-image. FIG. 3 shows a version of such a bipolar direct-current switching device 10 for illustration.

Alternatively however, an additional mechanical switching device 54 can also be used in the current path 12 behind the circuit unit 18, in other words the H-bridge circuit 20 of FIG. 1, wherein the circuit arrangement 14 here also comprises a surge arrester 56, which is connected in a parallel current path 58 in parallel with the other mechanical switching device 54.

This type of interconnection results in the advantage that when switching on, for example, only the one mechanical switching device 16 is closed, while the other mechanical switching device 54 remains open. This means that the capacitive components (capacitors) 22, 24 are charged first, before the connected direct current system is engaged. If, for example, a problem should exist here, then immediately after engaging the other mechanical switching device 54 the device can be switched off again.

LIST OF REFERENCE NUMERALS

10 direct-current switching device
12 current path
14 circuit arrangement
16 switching device, mechanical
18 circuit unit
20 bridge circuit, H-shaped
22 component, capacitive
24 component, capacitive
26 component, inductive
28 component, inductive
30 resistance component
32 resistance component
34 switching device, switch
36 current branch, first
38 current branch, second
40 transverse current path
42 surge arrester
44 parallel circuit path
46 control and/or regulation device
48 signal path
50 circuit unit, additional
52 bridge circuit, H-shaped
54 switching device, mechanical
56 surge arrester, additional
58 parallel current path, additional
I direct current
I1 current through the switching device
I2 current through the capacitive components
I3 current through the surge arrester
E ground

The invention claimed is:

1. A direct-current switching device for interrupting a direct electric current flowing along a medium or high voltage current path, the device comprising:
   an electric circuit arrangement including at least one mechanical switching device to be connected in the medium or high voltage current path;
      at least one circuit unit configured to force a current zero crossing in the mechanical switching device connected in the medium or high voltage current path;
   said at least one circuit unit having a plurality of capacitive components and a switch connected in said circuit unit so that:
      in a first switching state of said switch, said capacitive components are connected in parallel for a respective electrical charging process via the medium or high voltage current path; and
   in a second switching state of said switch, said capacitive components are connected in series to generate a current pulse which forces the current zero crossing;
   said at least one circuit unit further including a plurality of components selected from the group consisting of inductive components and resistance components;
   said at least one circuit unit being an H-shaped bridge circuit or including an H-shaped bridge circuit;
   said H-shaped bridge circuit, or at least one of said H-shaped bridge circuits including a first current branch, a second current branch and a transverse current path;
   said first current branch diverging from the medium or high voltage current path, in which at least one of said capacitive components, at least one of said inductive components and at least one of said resistance components are arranged in series;
   said second current branch diverging from the medium or high voltage current path, in which at least one of said capacitive components, at least one of said inductive components and at least one of said resistance components are arranged in series; and
   said transverse current path connecting said first current branch to said second current branch and containing therein said switch.

2. The direct-current switching device according to claim 1, wherein wherein said capacitive components, and said switch are connected in said H-shaped bridge circuit.

3. The direct-current switching device according to claim 1, wherein said first and second current branches connect the medium or high voltage current path to a common reference potential.

4. The direct-current switching device according to claim 1, wherein said capacitive component of said first current branch is connected in said first current branch between the medium or high voltage current path and the transverse current path and said capacitive component of said second current branch is arranged on a side of said second current branch facing away from the medium or high voltage current path with respect to the transverse current path.

5. The direct-current switching device according to claim 1, wherein said mechanical switching device or at least one of said mechanical switching devices is a vacuum interrupter.

6. The direct-current switching device according to claim 1, wherein said circuit arrangement has an overvoltage arrester connected in parallel with said at least one mechanical switching device.

7. The direct-current switching device according to claim 1, which comprises an open-loop or closed-loop control device for a coordinated activation of said at least one mechanical switching device and said at least one switch.

8. A method of interrupting a direct electric current flowing along a medium or high voltage current path, the method comprising:
   providing a switching device with an electric circuit arrangement including at least one mechanical switching device connected in the medium or high voltage current path and with at least one circuit unit configured to force a current zero crossing in the mechanical switching device connected in the medium or high voltage current path;
   providing the at least one circuit unit with a plurality of capacitive components and a switch;
   providing the at least one circuit unit with a plurality of components selected from the group consisting of inductive components and resistance components;
   providing the at least one circuit unit as an H-shaped bridge circuit or including an H-shaped bridge circuit in the at least one circuit unit;
   providing the H-shaped bridge circuit, or at least one of said H-shaped bridge circuits with a first current branch, a second current branch and a transverse current path;
   operating the switch in a first switching state wherein the capacitive components are connected in parallel for a respective electrical charging process via the medium or high voltage current path;
   operating the switch in a second switching state by connecting the capacitive components in series to generate a current pulse which forces the current zero crossing; and
   interrupting the direct electric current flowing along a medium or high voltage current path by switching the at least one mechanical switching device at the current zero crossing;
   wherein the first current branch diverges from the medium or high voltage current path, in which at least one of the capacitive components, at least one of the inductive components and at least one of the resistance components are arranged in series;
   wherein the second current branch diverges from the medium or high voltage current path, in which at least one of the capacitive components, at least one of the inductive components and at least one of the resistance components are arranged in series; and
   wherein the transverse current path connects the first current branch to the second current branch and containing therein the switch.

* * * * *